(12) United States Patent
Becker et al.

(10) Patent No.: US 8,371,801 B2
(45) Date of Patent: Feb. 12, 2013

(54) SYSTEMS FOR IMPROVED FLUID FLOWS THROUGH A TURBINE

(75) Inventors: Frederick E. Becker, Reading, MA (US); Kerry N. Oliphant, Sandy, UT (US); Andrew R. Provo, Sharon, VT (US); Tsukasa Yoshinaka, Town of Mount Royal (CA)

(73) Assignee: Hydro Green Energy, LLC, Westmont, IL (US)

( * ) Notice: Subject to any disclaimer, the term of this patent is extended or adjusted under 35 U.S.C. 154(b) by 614 days.

(21) Appl. No.: 12/618,408

(22) Filed: Nov. 13, 2009

(65) Prior Publication Data

US 2010/0119353 A1    May 13, 2010

Related U.S. Application Data

(60) Provisional application No. 61/114,202, filed on Nov. 13, 2008.

(51) Int. Cl.
*F03B 13/12*    (2006.01)

(52) U.S. Cl. .... 415/3.1; 415/4.3; 415/213.1; 415/218.1; 415/199.4; 415/220; 415/906; 415/908; 29/43; 29/54

(58) Field of Classification Search ............... 415/3.1, 415/4.3, 4.4, 213.1, 218.1, 220, 193, 906, 415/908, 199.4; 290/43, 54
See application file for complete search history.

(56) References Cited

U.S. PATENT DOCUMENTS

| | | | | |
|---|---|---|---|---|
| 4,095,918 A | * | 6/1978 | Mouton et al. | 415/7 |
| 4,163,904 A | * | 8/1979 | Skendrovic | 290/54 |
| 4,868,408 A | * | 9/1989 | Hesh | 290/52 |
| 5,040,945 A | * | 8/1991 | Levesque | 415/124.1 |
| 6,013,955 A | * | 1/2000 | dos Santos Costa | 290/54 |
| 2005/0001432 A1 | * | 1/2005 | Drentham Susman et al. | 290/43 |
| 2007/0284884 A1 | * | 12/2007 | Stothers et al. | 290/54 |

* cited by examiner

*Primary Examiner* — Igor Kershteyn

(57) ABSTRACT

A system for installing and extracting a flowing water turbine below the surface of the water includes a flow inducer assembly for improving the conversation of the kinetic energy of a waterway to mechanical energy. The flow inducer assembly includes a nozzle that may be shaped as a cowling and a outlet diffuser. The system may be useful in a number of settings, including, but not limited to, streams, rivers, dams, ocean currents, or tidal areas that have continuous or semi-continuous water flow rates and windy environments.

8 Claims, 8 Drawing Sheets

SYSTEMS FOR IMPROVED FLUID FLOWS THROUGH A TURBINE

RELATED APPLICATION DATA

This application claims the benefit of priority of U.S. Provisional Patent Application No. 61/114,202 filed Nov. 13, 2008, and titled Turbine Shroud Assembly with Nozzle and Diffuser.

FIELD OF THE INVENTION

The present invention generally relates to the field of turbines that produce usable energy from the flow of water. In particular, the present invention is directed to a system for improved fluid flows through a turbine.

BACKGROUND

Hydropower is a renewable resource that is derived from the force or energy of moving water. For centuries hydropower has been used to accomplish tasks such as milling, pumping, sawing timber, and manufacturing. More recently, hydropower's usefulness as a source for electric power generation has been more fully exploited and today comprises a significant portion of the world's electricity needs.

Harnessing a waterway's kinetic energy is challenging. For example, placing conventional hydroelectric turbines in a waterway will not result in significant power creation because the turbines are generally designed for high head conditions, e.g., a dam or waterfall, and thus will not rotate at an appreciable rate in a free flowing environment. As another example, use of a modified wind turbine, e.g., waterproof, different blade designs, etc., to capture waterway energy, has also proved unsuccessful because of an inability to survive standard waterway conditions, suffering from sheared blades during standard river conditions and an inability to handle the torque produced by the flowing water. Obvious improvements like stronger materials for turbine blades have not proved sufficient to allow for sustainable operation.

SUMMARY

A system for improving flow through a flowing water turbine, comprising: a support structure; a nozzle coupled to the support structure, the nozzle having a nozzle outlet and a nozzle trailing edge at the nozzle outlet; a diffuser coupled to the support structure, the diffuser having a diffuser inlet and a diffuser leading edge at the diffuser inlet; and a turbine movable relative to the support structure and having a turbine leading edge and turbine trailing edge, wherein the turbine leading edge sealingly engages the nozzle trailing edge and the turbine trailing edge sealingly engages the diffuser leading edge as the turbine travels along a portion of the support structure.

A system for improving flow through a flowing water turbine, comprising a nozzle housing configured to direct flow into the turbine, wherein the nozzle comprises a housing defining an inlet and an outlet for communication with the turbine, wherein the inlet defines a leading edge surrounding the inlet and having a leading edge radius, the leading edge radius having a leading edge radius ratio of about 1:1 to about 4:1.

A method for deploying a flowing water turbine, comprising: providing an underwater nozzle and an underwater diffuser with an opening defined therebetween; lowering a turbine assembly into the opening; aligning the turbine assembly coaxially with the nozzle and diffuser; and sealing the turbine assembly with respect to the nozzle and diffuser.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

The present invention is generally directed to a system for improving fluid flows through a turbine that may be useful in a number of settings, including, but not limited to, streams, rivers, dams, ocean currents, or tidal areas that have continuous or semi-continuous water flow rates and windy environments. Generally, a turbine flow system 10 made in accordance with certain embodiments of the present invention includes a turbine having a plurality of blades for the conversion of energy from a flowing fluid, e.g., water, air, etc., into rotational energy that may be used to power any number of apparatuses, including, but not limited to, pumps and fans, or for use in energy conversion apparatuses such as generators.

Figure 1:
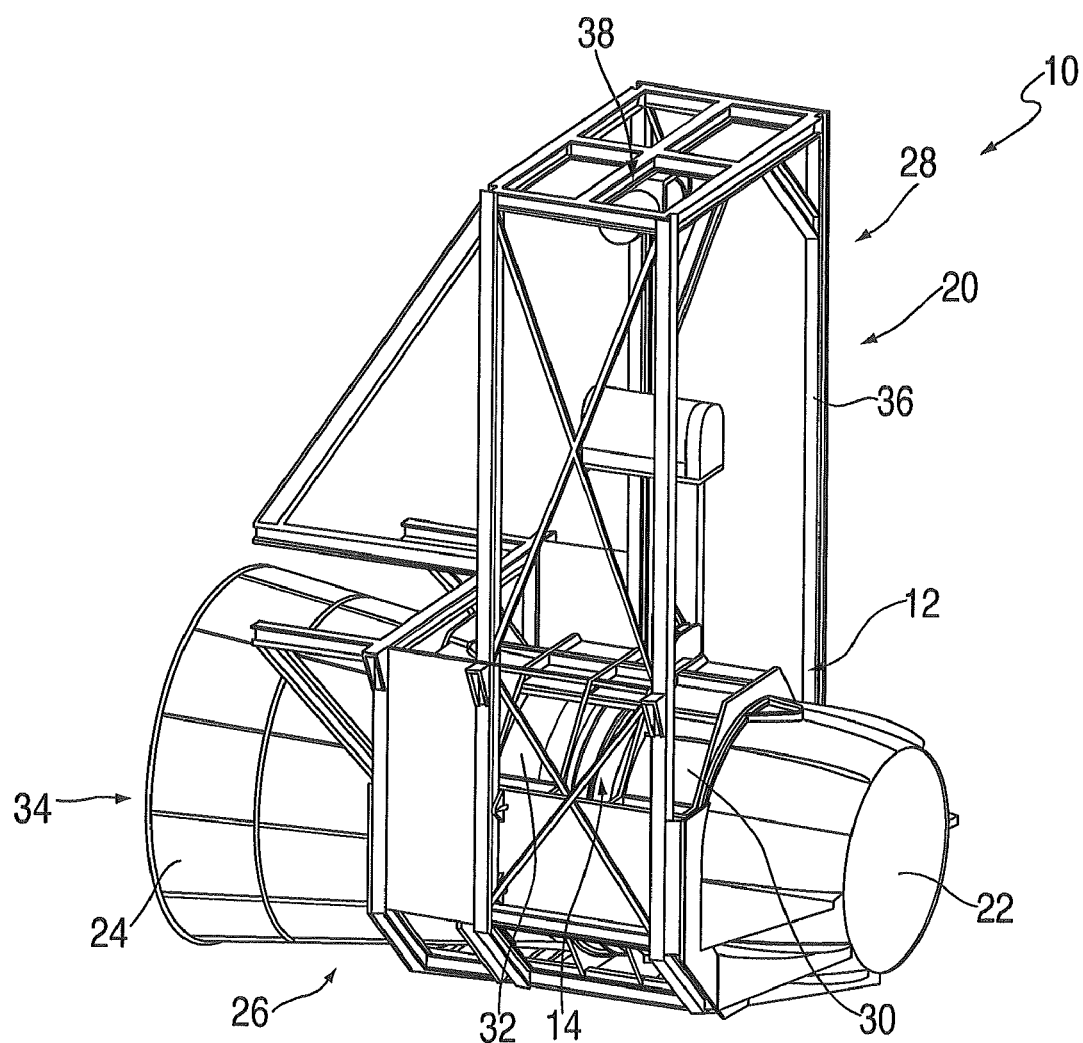
FIG. 1 is an isometric view of an example of a flowing water system with nozzle and diffuser and a support structure with associated components in accordance with an embodiment of the present invention.

Referring now to FIG. 1, turbine flow system 10 generally includes a support structure 20, a turbine assembly 12, and flow directing structures such as a nozzle 22 and a diffuser 24. Support structure 20 will generally be located at least partially above the surface of the water and below the surface of the water.

Support structure 20 may include a turbine support 26 and a support frame 28, which may be configured to support and maneuver turbine flow system 10 in the water. Turbine support 26 may carry the underwater assembly of turbine flow system 10 or only certain components of turbine flow system 10, such as flow inducer assembly 34. In an exemplary embodiment, turbine support 24 includes a plurality of guide members 36 that extend from support frame 28 to below the surface of the water. Guide members 36 may allow for both lateral and longitudinal movement of turbine assembly 12 along at least a portion of their length. Generally, guide members 36 allow for the insertion and extraction of turbine assembly 12, including, for example, other components such as inlet housing 30 or outlet housing 32, of turbine flow system 10 from the waterway.

Figure 2:
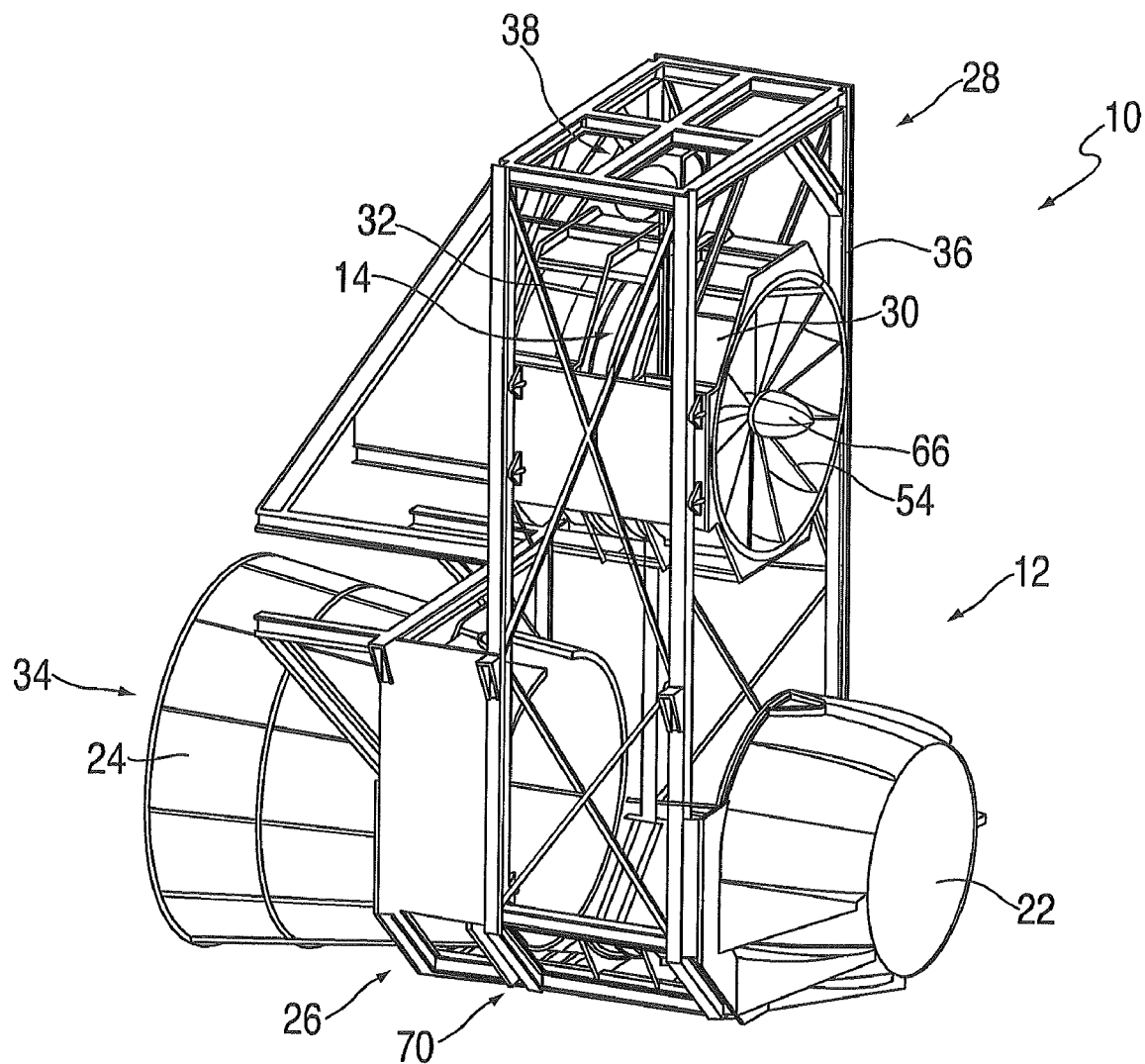
FIG. 2 is an isometric view of an example of a flowing water system with nozzle and diffuser and a support structure with associated components when a turbine has been extracted from the water in accordance with an embodiment of the present invention.

As shown in FIGS. 1 and 2, support frame 28 is generally a partially above water structure that may include an extractor 38 to move a portion of turbine flow system 10 along guide members 36. Extractor 38 may take on many forms such as hoists, winches, cranes, etc, which are be capable of moving turbine along guide members 36.

Support structure 20 may be constructed of any suitable materials known in the art for creating such structures. In an exemplary embodiment, support structure 20 is made of low-carbon steel. Use of support structure 20 allows for, among other things, the proper positioning of turbine 14 in a waterway, maintenance or replacement of turbine assembly 12, and/or for maintaining and/or manipulating the vertical distance between turbine flow system 10 and the support structure. Support structure 20 may be supported off-shore or may be supported by an on-shore structure sized and configured to support the remainder of turbine flow system 10.

Figure 3:
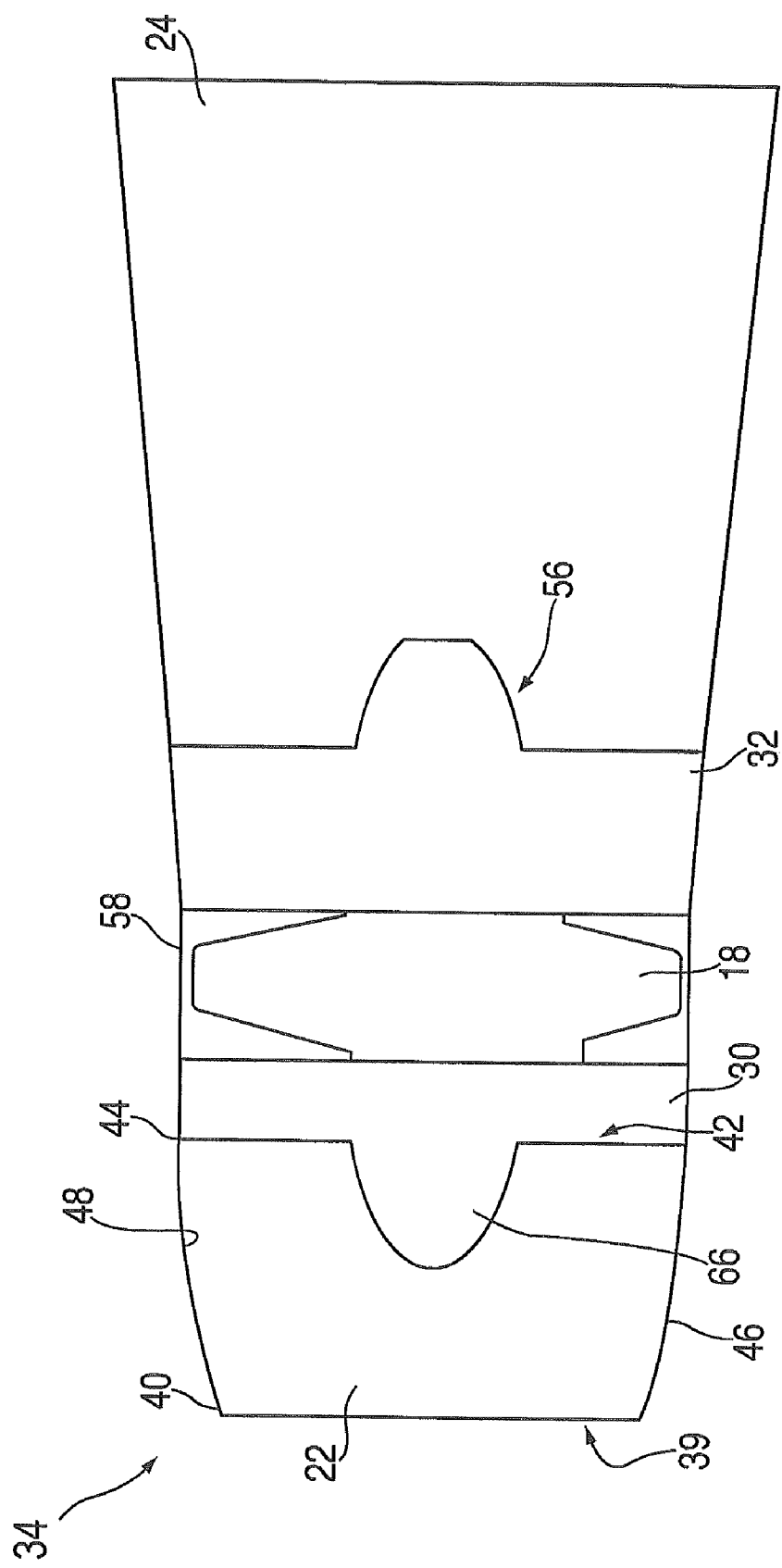
FIG. 3 is an isometric view of an exemplary flowing water system with nozzle and diffuser in accordance with an embodiment of the present invention.
Figure 4:
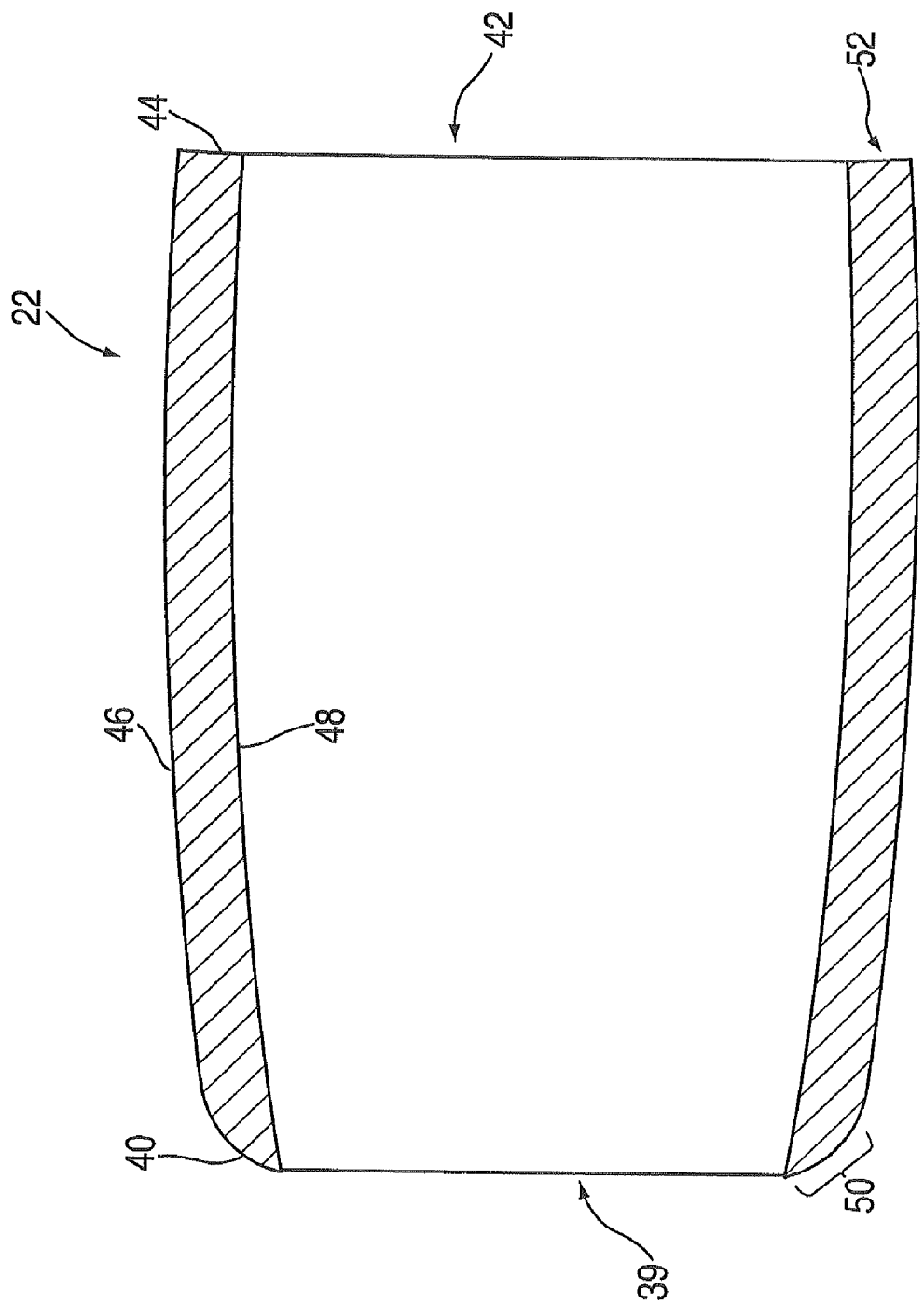
FIG. 4 is a schematic cross-sectional view of a portion of a nozzle in accordance with an embodiment of the present invention.

As shown in FIGS. 3 and 4, flow inducer assembly 34 may include nozzle 22, which may be configured and dimensioned to minimize boundary layer disturbance and to increase flow through turbine 14. Nozzle 22 has a generally circular inlet cross section 39 with leading edge 40 and a generally circular outlet cross section 42 with a trailing edge 44. Nozzle 22 may also include an outside surface 46 and inside surface 48 spanning the distance between leading edge 40 and trailing edge 44 on the outside and inside of nozzle 22, respectively. Generally, leading edge 40 has a leading edge radius ratio 50, the ratio of an ellipse's major axis to minor axis which serves to maintain flow near outside surface 46. Generally, only a semi-ellipse along the major axis upstream of nozzle 22 is used for leading edge 40. The leading edge radius ratio 50, in an exemplary embodiment of nozzle 22, may be in the range of 1:1 to 4:1. In an alternative embodiment, the leading edge radius ratio 50 may be in the range of 2:1 to 3:1.

Outside surface 46 and inside surface 48 typically, but not necessarily, have similar diffusion pathways, i.e., the curvature of outside surface 46 from leading edge 40 to trailing edge 44 is substantially similar to the curvature of inside surface 48 from leading edge 40 to trailing edge 44. Outside surface 46 may be generally conical with an overall half angle of about 1.5 degrees to about 4 degrees. In exemplary embodiment, outside surface 46 may have a generally conical shape with an overall half angle of 3 degrees. In an alternative embodiment, outside surface 46 may have a shape with a varying half angle ranging from a half angle of about 4 degrees near leading edge 40 and to a half angle of about 1.5 degrees near trailing edge 44. The half angle(s) chosen for outside surface 46 may be dependent upon a number of factors, including, but not limited to, the expected flow rate of the waterway, the static pressure relief necessary for return flows, the sweep area of turbine 14, the half angle(s) chosen for inside surface 48, etc.

Figure 8:
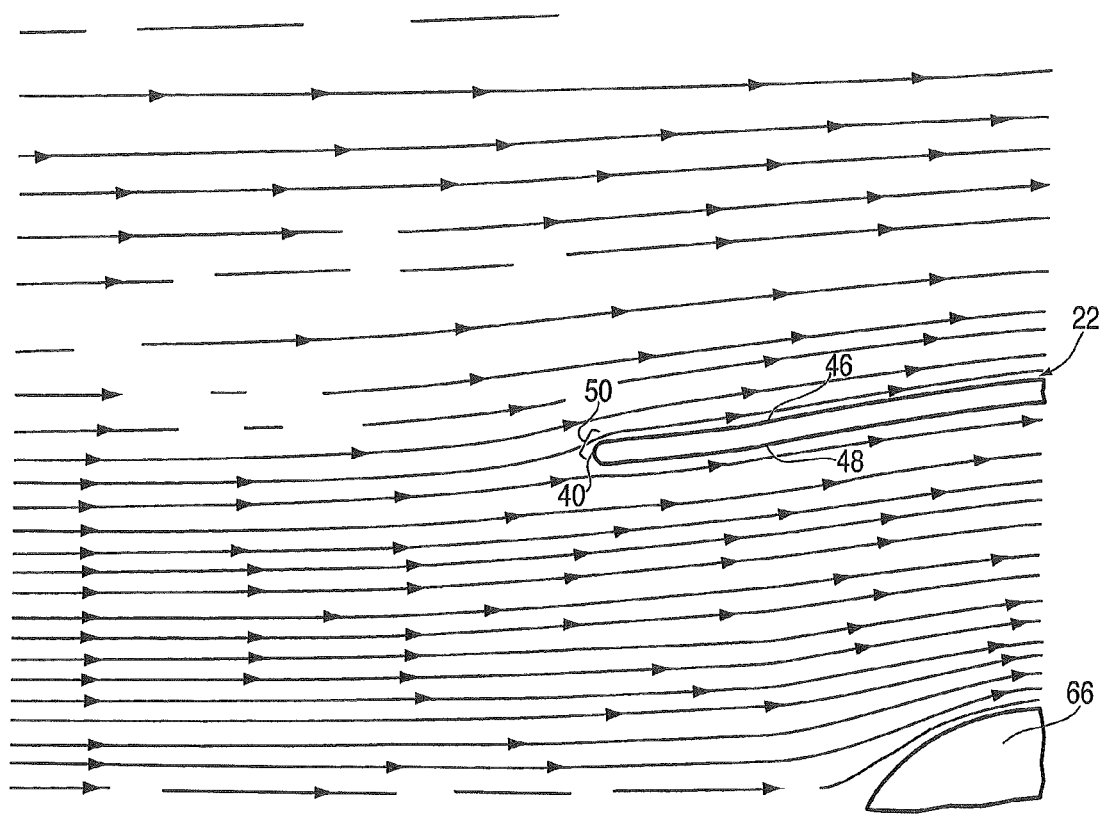
FIG. 8 is a schematic of a portion of a turbine in accordance with an embodiment of the present invention.

In a further exemplary embodiment where outside surface 46 has a generally conical shape with an overall half angle of about 3 degrees, inside surface 48 may have a generally conical shape with an overall half angle of about 3.5 degrees. In this instance, a wall thickness 52 between outside surface 46 and inside surface 48 may be configured so as to allow for the different half angles of the outside surface and the inside surface. In yet another alternative embodiment, outside surface 46 and inside surface 48 have similar contours that mimic an "S" shape having an overall half angle of about 3 degrees (FIG. 8). The half angle(s) chosen for inside surface 48 may be dependent upon a number of factors, including, but not limited to, the expected flow rate of the waterway, the static pressure relief necessary for return flows, the sweep area of turbine 14, the half angle chosen for outside surface 46, etc. In an exemplary embodiment, the half angle(s) for inside surface 48 and outside surface 46 are implemented such that the their respective diffusion pathways are complimentary to each other.

In another exemplary embodiment nozzle 22 may be generally cylindrical with a bullnose (approximately symmetrically rounded) front edge (not shown). This embodiment may be used, for instance, when high mass fluid flow is induced by diffuser 24, which makes the upstream capture area of turbine flow system 10 very nearly the same as the sweep area of turbine 14.

Referring again to FIG. 3, flow inducer assembly 34 may also include diffuser 24 so as to condition the water exiting turbine 14 for reentry into the waterway. Generally, diffuser 24 is sized and configured to minimize the static pressure after turbine 14 so that turbine flow system 10 experiences increased flow. In an exemplary embodiment, diffuser 24 has a diameter that enlarges gradually along its longitudinal axis up to a maximum of about 1.3 times the diameter of the diffuser at a point proximate turbine 14. In another exemplary embodiment, diffuser 24 has a half angle of greater than about 15 degrees. Overall, the design of turbine flow system 10, e.g., nozzle 22 and turbine 14, may allow for such a relatively large half angle to be used effectively. In yet another exemplary embodiment, diffuser 24 has a half angle of greater than about 20 degrees.

As shown in FIGS. 6A-D, flow inducer assembly 34 may have an opening 70 between nozzle 22 and diffuser 24 configured and dimensioned to receive turbine assembly 12. In the embodiment of FIGS. 6A-D, diffuser 24 may be dimensioned and configured so that the inlet to the diffuser is generally oblong in shape. This configuration changes the shape of opening 70 (also shown in FIG. 2) so that the opening has a top 72 that is wider in the axial direction than a bottom 74. In an exemplary embodiment, diffuser 24 also includes a hard block 76 that projects into opening 70 along the outside of the flow inducer assembly. Hard block 76 has an angled leading edge that is used to wedge the turbine assembly into a sealed position as described in more detail below.

Figure 7:
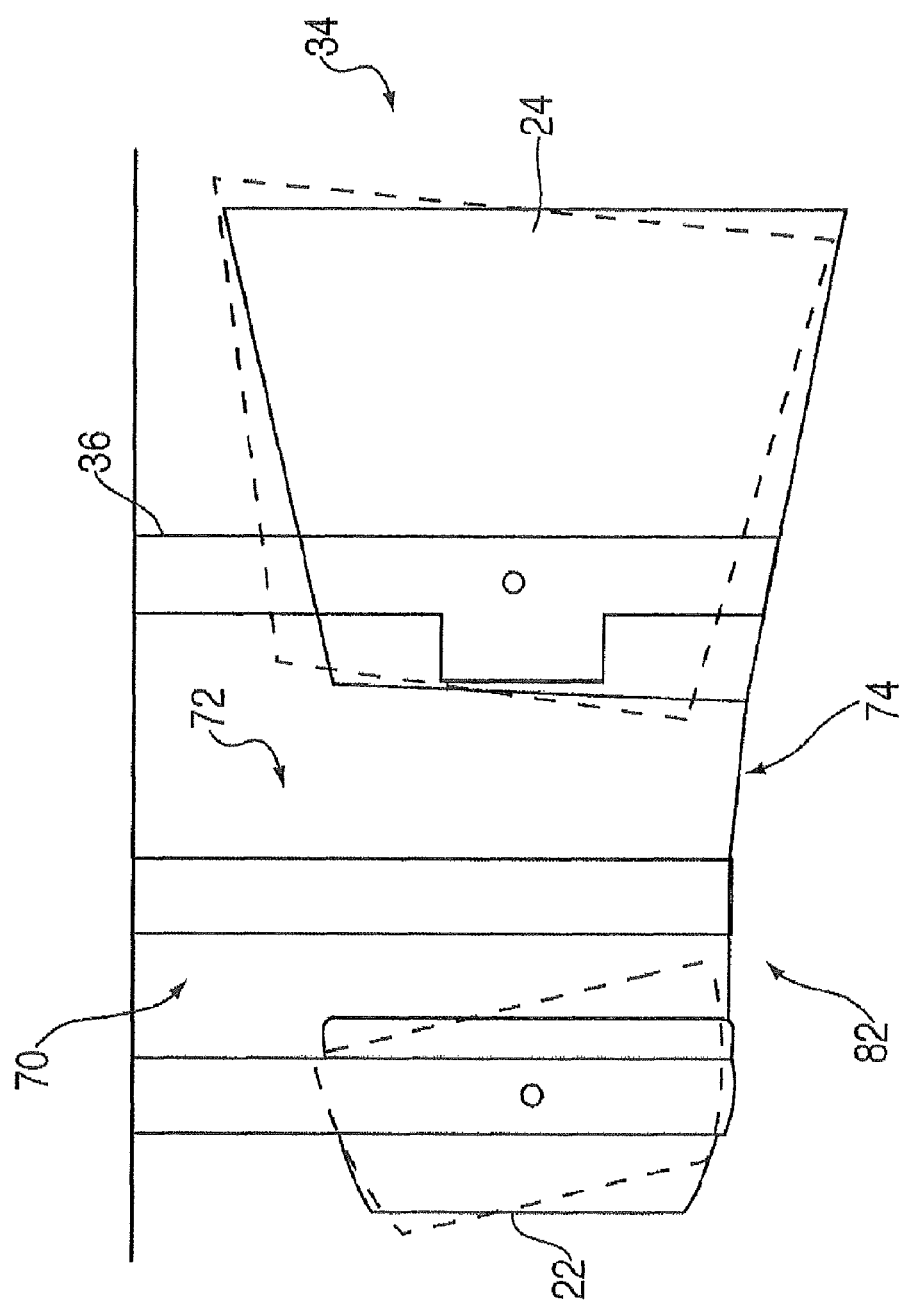
FIG. 7 is a schematic of a flowing water system in accordance with another embodiment of the present invention.

Flow inducer assembly 34 may take on other configurations to allow for the insertion of turbine assembly 12 between nozzle 22 and diffuser 24. In one such embodiment, and as shown in FIG. 7, both the outlet of nozzle 22 and the inlet of diffuser 24 form oblique angles with respect to the longitudinal axis of flow inducer assembly 34 by being pivotably coupled to turbine support 26. Although a generally central pivot point is shown in FIG. 7, nozzle 22 and diffuser 24 may be pivotably coupled to turbine support at several locations, such as lower on turbine support 26. The determination on where to locate the pivots may be dependent upon the pressure differentials experienced by turbine assembly 12 as well as the configuration and dimensions of nozzle 22 and diffuser 24. In any event, the configuration also generally allows for opening 70 to be wider at its top 72 than at bottom 74. In operation, as turbine 14, and/or its associated components descend toward flow inducer assembly 34 and make contact with trailing edge 44 of nozzle 22 and the leading edge of diffuser 24, nozzle 22 and diffuser 24 pivot to shrink top 72 and to expand bottom 74, with the weight of turbine assembly 12 providing at least a portion of the necessary force to cause the movement of nozzle 22 and diffuser 24. When turbine assembly 12 has reached its final position on guide members 36, for instance, at a cradle 82 (FIG. 6D), turbine 14, diffuser 24, and nozzle 22 would be substantially coaxial. In this embodiment, turbine assembly 12 alternatively may be dimensioned and configured to engage nozzle 22 and diffuser 24, such as the embodiment shown in FIG. 1, where inlet housing 30 and outlet housing 32 have substantially parallel sides.

Figure 6A:
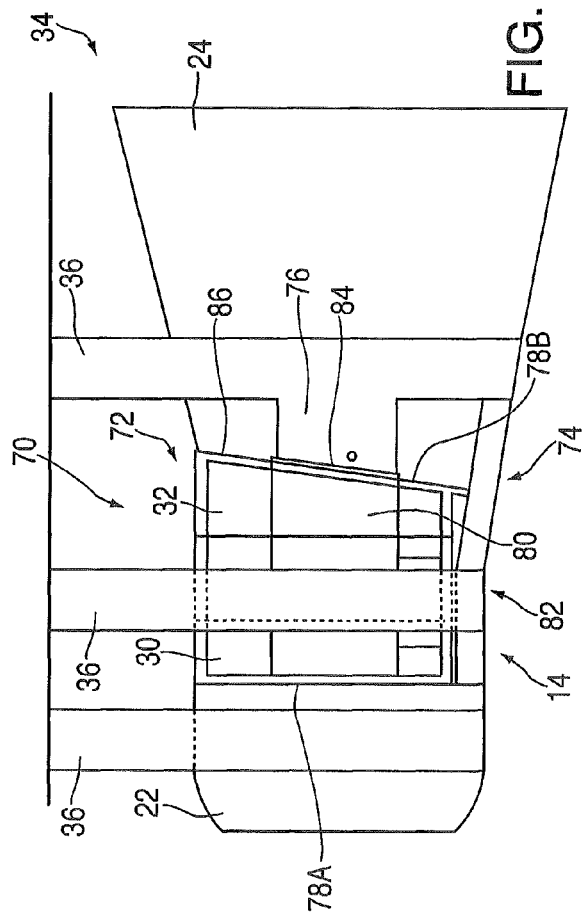
FIG. 6A is a schematic of a flowing water system in accordance with another embodiment of the present invention.
Figure 6D:
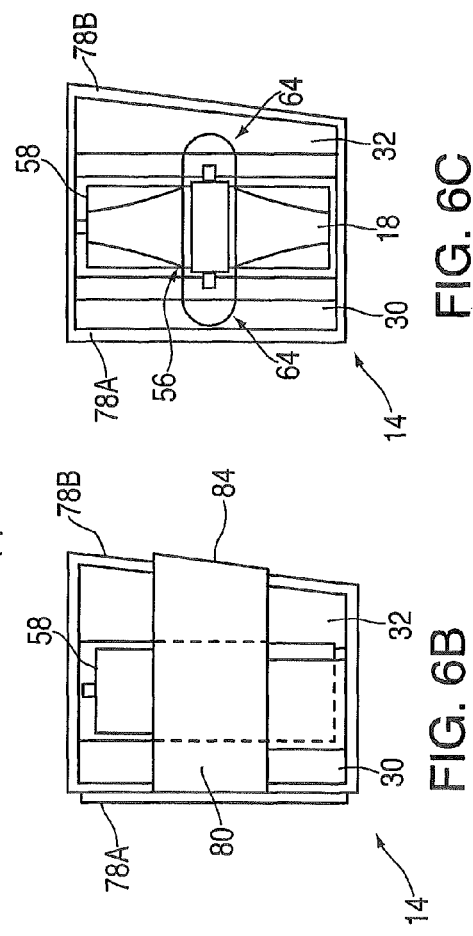
FIG. 6D is a schematic of a turbine for the flowing water system in accordance with an embodiment of the present invention.
Figure 6C:
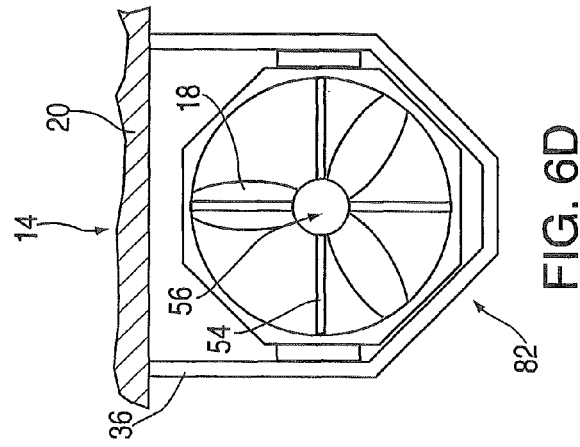
FIG. 6C is a schematic cut-away side view of a turbine for the flowing water system in accordance with an embodiment of the present invention.
Figure 6B:
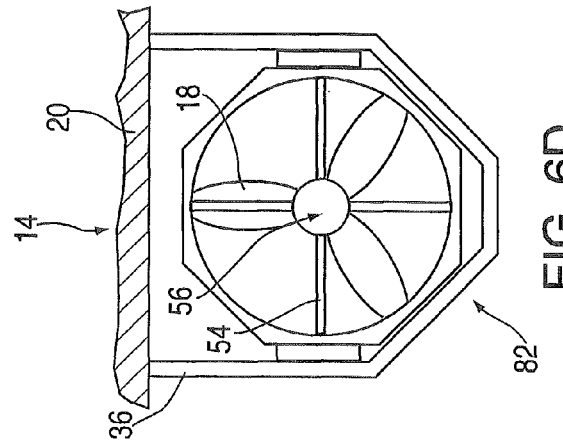
FIG. 6B is a schematic of a turbine for the flowing water system in accordance with an embodiment of the present invention.

In a further alternative embodiment, inlet housing 30 may have a slanted or oblong entry cross-section (not shown) and/or outlet housing 32 may have a slanted or oblong exit cross-section as shown in FIGS. 6A-C, in which case, the outlet of nozzle 22 and/or the inlet of diffuser 24 would be designed to have complimentary features to the inlet housing and the outlet housing, respectively.

As shown, for example, in FIG. 6B, turbine assembly 12 may comprise a turbine 14 coupled to inlet housing 30 and outlet housing 32. Housings 30 and 32 may be mated to turbine 14 such that turbine 14 may rotate relative thereto. As used herein, mated means complementarily shaped and disposed in close proximity, but not necessarily touching, so as to minimize flow leakage between the parts.

Inlet housing 30 is generally cylindrical with an axis coaxial with the axis of turbine 14, nozzle 22, and diffuser 24. Inlet housing 30 typically includes support for center shaft 56 via struts 54 and bearing block 64. In an exemplary embodiment, inlet housing 30 supports and allows for the rotation of shaft 56 on both sides of turbine 14 and limits axial movement of turbine 14. Struts 54 generally extend from bearing block 64 to the interior surface of inlet housing 30. Attached upstream of bearing block 64 may be a cone deflector 66 or other suitable attachment for guiding the flow of water around bearing block 64. Shaft 56 is typically aligned inside bearing block 64 via a bearing assembly (not shown). Generally, the bearing assembly allows shaft 56 to flex with the movement of shaft 56. In an exemplary embodiment, the bearing assembly is a mechanical articulating joint such as a rod end bearing.

Figure 5:
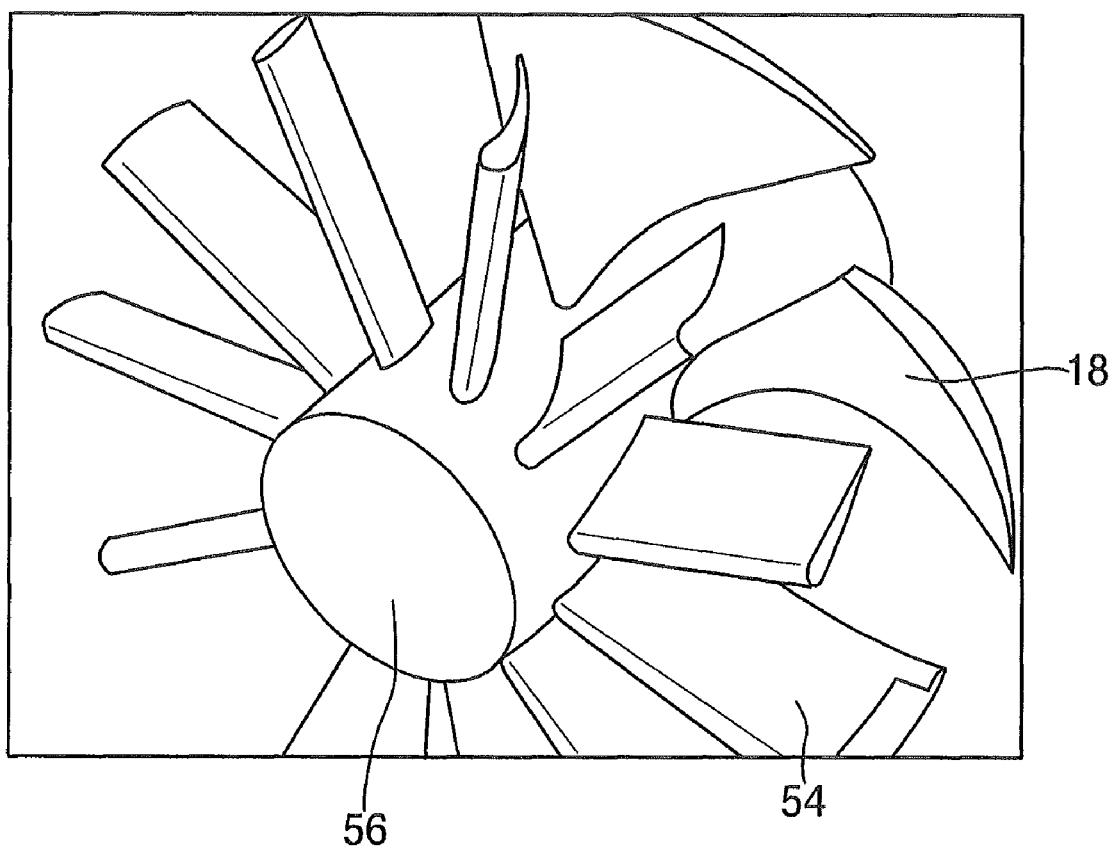
FIG. 5 is an isometric view of a portion of a turbine in accordance with an embodiment of the present invention.

Generally, struts 54 provide structural stability for turbine flow system 10 and support bearing block 64. In an exemplary embodiment, each of struts 54 are a flat plate of sheet metal with rounded leading and trailing edges to minimize drag. In certain embodiments, struts 54 may be sized and configured to reduce drag by, for instance, angling the struts in the axial direction (best scene in FIG. 5). In an exemplary embodiment, struts 54 are angled at 15 degrees from the axial direction when the flow coming off of the turbine 14 may have an angle ranging from about 30 degrees at shaft 56 to near 0 degrees at a shroud 58. In this example, the placement of struts 54 at an angle of about 15 degrees keeps the angle of attack by the flow on the struts to within 15 degrees of the angle range of turbine 14. Struts 54 may be constructed of materials including, but not limited to, steels, aluminum, and titanium, that will provide the strength and corrosion resistance suitable for an underwater environment. In addition, although twelve struts are shown in FIG. 2 and eleven struts are shown in FIG. 5, more or fewer struts may be use in turbine flow system 10.

Turbine 14 is generally cylindrical and includes blades 18 and an annular shroud 58 that is coaxial with shaft 56. Blades 18 may extend from shaft 56 to shroud 58 or may end at a point just short of shroud 58 and thus rotate independent of shroud 58 (FIG. 3). Typically, and as best seen in FIG. 5, blades 18 are configured so as to have a portion of blades 18 form oblique angles with the flow of water traveling from the upstream side to the downstream side of blades 18. In this configuration, the water's movement places pressure on blades 18 causing the turbine 14 to rotate. Blades 18 may be constructed of materials including, but not limited to, plastic, metal, and rubber. In one exemplary embodiment, blades 18 are made of aluminum.

Outlet housing 32 is generally cylindrical with an axis coaxial with the axis of turbine 14, inlet housing 30, nozzle 22, and diffuser 24. Outlet housing 32 also typically includes support for center shaft 56 via struts 54 and bearing block 64. In an exemplary embodiment, outlet housing 32 supports and allows for the rotation of shaft 56 on both sides of turbine 14 and limits axial movement of turbine 14. Attached on the downstream side of bearing block 64 may be a cone deflector 66 or other suitable attachment for guiding the flow of water there around. Shaft 56 is typically support via a bearing within bearing block 64 that is similar to the bearing assembly previously described with the inlet housing 30.

As shown in FIGS. 6A-C, the interface between nozzle 22 and inlet housing 30 as well as between diffuser 24 and outlet housing 32 may also include plural elastomeric rings 78, e.g., 78A and 78B. Elastomeric rings 78 may be fashioned from many materials with suitable compliance characteristics such as ethylene propylene diene (more commonly referred to as EPDM). Elastomeric rings are typically dimensioned and configured to seal the interface between the below water structures, e.g., nozzle 22 and diffuser 24, and turbine 14 with its associated components, e.g., inlet housing 30 and outlet housing 32. In an exemplary embodiment elastomeric ring 78A may be disposed on inlet housing 30 and elastomeric ring 78B may be disposed on outlet housing 32. Placing elastomeric rings 78 on the housing, which in some embodiments, may be extractable from the water, allows for maintenance and replacement of the elastomeric rings. In alternative embodiments, elastomeric ring 78A may be disposed on nozzle 22 and elastomeric ring 78B may be disposed on diffuser 24.

Turbine assembly 12 may also include connectors 80 for attaching inlet housing 30 to outlet housing 32. Connectors 80 are disposed on the outer periphery of inlet housing 30 and outlet housing 32 and generally do not make contact with turbine 14. In an exemplary embodiment, one or more of connectors 80 have at least one slanted edge 84 that is dimensioned and configured to slidingly engage with hard slant block 76.

Generally, turbine flow system 10 allows for the installation and extraction of turbine assembly 12 into and out of flow inducer assembly 34. For the installation to occur, typically turbine assembly 12 would move in a generally vertical direction from a point above flow inducer assembly 34 to a point inside the flow inducer assembly where the turbine axis is substantially aligned with the axes of the nozzle 22 and diffuser 24. Sliding friction between the edges of the turbine assembly and the fore and aft structures may provide sufficient sealing, particularly when elastomeric seals as previously discussed are disposed at the sliding joints. However, to reduce sliding friction and possibilities for misalignment other systems may be employed as described below. Cradle 82 is configured and dimensioned to substantially align the axis of turbine 14 with the axis of nozzle 22 and diffuser 24. This allows for generally repeatable descents of turbine assembly 12 into a known location, e.g., coaxial alignment with nozzle 22 and diffuser 24.

In one exemplary embodiment of turbine flow system 10, turbine assembly 12 is lowered from a point above flow inducer assembly 34, which may be any point along guide members 36, to top 72. As turbine assembly 12 descends vertically, elastomeric ring 78B on angled trailing edge 84 of turbine assembly 12 first contacts a leading edge 86 of diffuser 24 due to the complimentary angled edges of outlet housing 32 and the leading edge. As turbine assembly 12 continues to descend, the contact between elastomeric ring 68B and leading edge 86 may cause the movement of turbine assembly 12 in the horizontal forward direction, i.e., toward nozzle 12. Then, as turbine assembly 12 continues to descend, angled edge 84 engages with the complementary angled forward edge of hard block 76, which cooperate to move turbine assembly toward nozzle 22. Angled edge 84 and hard block 76 act to reduce pressure on elastomeric ring 78B as opening 70 narrows as well as to more forcefully compress elastomeric ring 78A against nozzle 22. As turbine assembly 12 nears cradle 82, elastomeric ring 78A continues to be compressed against the outlet of nozzle 22. When turbine assembly 12 rests in cradle 82, both elastomeric rings 78A and 78B are compressed between their respective housings and nozzle 22 and diffuser 24, respectively. In a further alternative embodiment, the pivoting arrangement as shown in FIG. 7 may be employed to provide a larger opening for insertion of turbine assembly, followed by pivoting closed to create a seal between the turbine assembly and nozzle and diffuser.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for improving flow through a flowing water turbine, comprising:
   a support structure;
   a nozzle coupled to said support structure, said nozzle having a nozzle outlet and a nozzle trailing edge at said nozzle outlet;
   a diffuser coupled to said support structure, said diffuser having a diffuser inlet and a diffuser leading edge at said diffuser inlet; and
   a turbine movable relative to said support structure and having a turbine leading edge and turbine trailing edge, wherein said turbine leading edge sealingly engages said nozzle trailing edge and said turbine trailing edge sealingly engages said diffuser
   leading edge as said turbine travels along a portion of said support structure wherein said nozzle trailing edge is not parallel to said diffuser leading edge.

2. The system according to claim 1, wherein said nozzle trailing edge is substantially perpendicular to a nozzle axis and wherein said diffuser trailing edge forms an oblique angle with a diffuser axis.

3. The system according to claim 1, wherein said nozzle trailing edge forms an oblique angle with a nozzle axis and wherein said diffuser trailing edge forms an oblique angle with a diffuser axis.

4. The system according to claim 3, wherein said nozzle is pivotably coupled to said support structure and wherein said diffuser is pivotable coupled to said support structure.

5. A system for improving flow through a flowing water turbine, comprising
   a support structure:
   a nozzle coupled to said support structure, said nozzle having a nozzle outlet and a nozzle trailing edge at said nozzle outlet;
   a diffuser coupled to said support structure, said diffuser having a diffuser inlet and a diffuser leading edge at said diffuser inlet; and
   a turbine movable relative to said support structure and having a turbine leading edge and turbine trailing edge, wherein said turbine leading edge sealingly engages said nozzle trailing edge and said turbine trailing edge sealingly engages said diffuser
   leading edge as said turbine travels along a portion of said support structure wherein said support structure moves said turbine to in a vertical direction and horizontal direction.

6. A system for improving flow through a flowing water turbine, comprising;
   a support structure;
   a nozzle coupled to said support structure, said nozzle having a nozzle outlet and a nozzle trailing edge at said nozzle outlet;
   a diffuser coupled to said support structure, said diffuser having a diffuser inlet and a diffuser leading edge at said diffuser inlet; and
   a turbine movable relative to said support structure and having a turbine leading edge and turbine trailing edge, wherein said turbine leading edge seal sealingly engages said nozzle trailing edge and said turbine trailing edge sealingly engages said diffuser
   leading edge as said turbine travels along a portion of said support structure wherein said turbine includes an exterior surface having a plurality of facets and wherein said structure includes a cradle having a plurality of flat surfaces, said facets and said flat surfaces cooperatively engaging to align said turbine substantially coaxially with said nozzle and said diffuser.

7. A method for deploying a flowing water turbine, comprising:
   providing an underwater nozzle and an underwater diffuser with an opening defined therebetween;
   lowering a turbine assembly into the opening;
   aligning the turbine assembly coaxially with the nozzle and diffuser; and
   sealing the turbine assembly with respect to the nozzle and diffuser wherein said sealing comprises moving the turbine assembly laterally toward nozzle during at least a part of said lowering of the turbine into the opening and, wherein said sealing further comprises wedging the turbine assembly against the nozzle.

8. A method for deploying a flowing water turbine, comprising:
   providing an underwater nozzle and an underwater diffuser with an opening defined therebetween;
   lowering turbine assembly into the opening;
   aligning the turbine assembly coaxially with the nozzle and diffuser; and
   sealing the turbine assembly with respect to the nozzle and diffuser wherein said sealing comprises pivoting at least one of the nozzle and diffuser into sealing engagement with the turbine assembly.

* * * * *